US009417366B2

(12) United States Patent
Rothenberg

(10) Patent No.: US 9,417,366 B2
(45) Date of Patent: Aug. 16, 2016

(54) HYBRID DIFFRACTIVE OPTICAL ELEMENT AND SPECTRAL BEAM COMBINATION GRATING

(71) Applicant: NORTHROP GRUMMAN SYSTEMS CORPORATION, Falls Church, VA (US)

(72) Inventor: Joshua E. Rothenberg, Los Angeles, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 257 days.

(21) Appl. No.: 13/954,812

(22) Filed: Jul. 30, 2013

(65) Prior Publication Data
US 2015/0036218 A1    Feb. 5, 2015

(51) Int. Cl.
*G02B 5/18* (2006.01)
*G02B 27/10* (2006.01)

(52) U.S. Cl.
CPC .............. *G02B 5/1814* (2013.01); *G02B 5/18* (2013.01); *G02B 5/1823* (2013.01); *G02B 5/1861* (2013.01); *G02B 27/1006* (2013.01); *G02B 27/1086* (2013.01); *G02B 27/1073* (2013.01)

(58) Field of Classification Search
CPC ...... G02B 5/18; G02B 5/1814; G02B 5/1861; G02B 5/1866; G01J 1/429
USPC .................................. 359/566, 576, 558, 569
See application file for complete search history.

(56) References Cited

U.S. PATENT DOCUMENTS

| 5,907,436 | A  | * | 5/1999  | Perry et al. ................. 359/576 |
| 6,366,358 | B1 |   | 4/2002  | Satou et al. |
| 6,697,192 | B1 |   | 2/2004  | Fan |
| 6,717,719 | B1 |   | 4/2004  | Moore |
| 7,199,924 | B1 |   | 4/2007  | Brown et al. |
| 7,436,588 | B2 |   | 10/2008 | Rothenberg |
| 7,466,731 | B2 |   | 12/2008 | Rothenberg |
| 7,535,631 | B2 |   | 5/2009  | Brown |
| 7,539,232 | B1 |   | 5/2009  | Corcoran |
| 7,755,835 | B2 | * | 7/2010  | Stuck et al. ................. 359/569 |
| 7,756,169 | B2 |   | 7/2010  | Livingston |
| 7,821,900 | B2 |   | 10/2010 | Rothenberg |
| 7,876,796 | B2 |   | 1/2011  | Damzen |
| 7,916,762 | B2 |   | 3/2011  | Messerly |
| 7,970,040 | B1 |   | 6/2011  | Sprangle |
| 8,009,358 | B2 |   | 8/2011  | Zalevsky |
| 8,094,689 | B1 |   | 1/2012  | Koplow |
| 8,179,594 | B1 |   | 5/2012  | Tidwell |
| 8,184,363 | B2 |   | 5/2012  | Rothenberg |
| 8,228,599 | B1 |   | 7/2012  | Carbon |

(Continued)

*Primary Examiner* — Bumsuk Won
*Assistant Examiner* — Grant Gagnon
(74) *Attorney, Agent, or Firm* — John A. Miller; Miller IP Group, PLC

(57) ABSTRACT

An integrated optical device that combines a diffractive optical element (DOE) to provide beam combining for coherent beams and a spectral beam combination (SBC) grating for combining beams of differing wavelengths. The device includes a substrate where a periodic pattern for the DOE is formed in the top surface of the substrate in a first direction. A plurality of reflective layers are deposited on the substrate over the periodic pattern so that the layers follow the shape of the pattern. A top dielectric layer is deposited on the plurality of reflective layers so that the top dielectric layer also follows the shape of the periodic pattern. A periodic grating for the SBC is formed into the top dielectric layer in a second direction substantially orthogonal to the first direction.

20 Claims, 4 Drawing Sheets

(56) References Cited

U.S. PATENT DOCUMENTS

| | | |
|---|---|---|
| 8,340,150 B2 | 12/2012 | Volodin |
| 8,340,151 B2 | 12/2012 | Liu |
| 8,411,712 B2 | 4/2013 | Honea |
| 2004/0181344 A1* | 9/2004 | Stephanopoulos et al. ..... 702/20 |
| 2005/0226559 A1 | 10/2005 | Nakama et al. |
| 2007/0086309 A1 | 4/2007 | Yang |
| 2010/0080938 A1 | 4/2010 | Toda et al. |
| 2011/0063701 A1 | 3/2011 | Yankov |
| 2011/0280581 A1 | 11/2011 | Chann |
| 2011/0305256 A1 | 12/2011 | Chann |
| 2012/0014397 A1 | 1/2012 | Chann |
| 2013/0170508 A1* | 7/2013 | Suzuki et al. ..................... 372/5 |
| 2014/0036352 A1* | 2/2014 | Pronin et al. .................. 359/346 |

\* cited by examiner

HYBRID DIFFRACTIVE OPTICAL ELEMENT AND SPECTRAL BEAM COMBINATION GRATING

BACKGROUND

1. Field

This invention relates generally to an optical device including a combined diffractive optical element (DOE) and spectral beam combination (SBC) grating and, more particularly, to a fiber laser array amplifier including an integrated optical element having a DOE and an SBC grating that provides both beam combining for coherent beams of the same wavelength and beam combining for incoherent beams of different wavelengths.

2. Discussion

High power laser amplifiers have many applications, including industrial, commercial, military, etc. Designers of laser amplifiers are continuously investigating ways to increase the power of the laser amplifier for these applications. One known type of laser amplifier is a fiber laser amplifier that employs a doped fiber and a pump beam to generate the laser beam, where the fiber has an active core diameter of about 10-20 µm or larger.

Improvements in fiber laser amplifier designs have increased the output power of the fiber to approach its theoretical power and beam quality limit. To further increase the output power of a fiber amplifier some fiber laser systems employ multiple fiber lasers that combine the fiber beams in some fashion to generate higher powers. A design challenge for fiber laser amplifier systems of this type is to combine the beams from a plurality of fibers in a coherent manner so that the beams provide a single beam output having a uniform phase over the beam diameter such that the beam can be focused to a small focal spot. Focusing the combined beam to a small spot at a long distance (far-field) defines the beam quality of the beam, where the more coherent the individual fiber beams the more uniform the combined phase and the better the beam quality.

In one known multiple fiber amplifier design, a master oscillator (MO) generates a signal beam that is split into a plurality of fiber beams each having a common wavelength where each fiber beam is amplified. The amplified fiber beams are then collimated and directed to a diffractive optical element (DOE) that combines the coherent fiber beams into a signal output beam. The DOE has a periodic structure formed into the element so that when the individual fiber beams each having a slightly different angular direction are redirected by the periodic structure all of the beams diffract from the DOE in the same direction. Each fiber beam is provided to a phase modulator that controls the phase of the beam so that the phase of all the fiber beams is maintained coherent. However, limitations on bandwidth and phasing errors limits the number of fiber beams that can be coherently combined, thus limiting the output power of the laser.

To overcome these limitations and further increase the laser power, multiple master oscillators are provided to generate signal beams at different wavelengths, where each of the individual wavelength signal beams are split into a number of fiber beams and where each group of fiber beams has the same wavelength and are mutually coherent. Each group of the coherent fiber beams at a respective wavelength are first coherently combined by a DOE, and then each group of coherently combined beams are directed to a spectral beam combination (SBC) grating at slightly different angles that diffracts the beams in the same direction as a single combined beam of multiple wavelengths. The SBC grating also includes a periodic structure for combining the beams at the different wavelengths.

A hybrid fiber laser amplifier system of this type can be found in U.S. Pat. No. 7,436,588 issued Oct. 14, 2008 to Rothenberg et al., titled Method and System for Hybrid Coherent and Incoherent Diffractive Beam Combining, assigned to the assignee of this application and herein incorporated by reference. The '588 patent discloses various embodiments for a hybrid fiber laser amplifier system, where each embodiment includes a DOE for providing coherent beam combining and an SBC grating for providing spectral beam combining, as discussed above. In one particular embodiment, the '588 patent combines the DOE and SBC grating into a single optical element where the periodic structure for the DOE and the SBC grating are orthogonal to each other.

DETAILED DESCRIPTION OF THE EMBODIMENTS

The following discussion of the embodiments of the invention directed to a fiber laser amplifier including an integrated DOE and SBC grating is merely exemplary in nature, and is in no way intended to limit the invention or its applications or uses.

Figure 1:
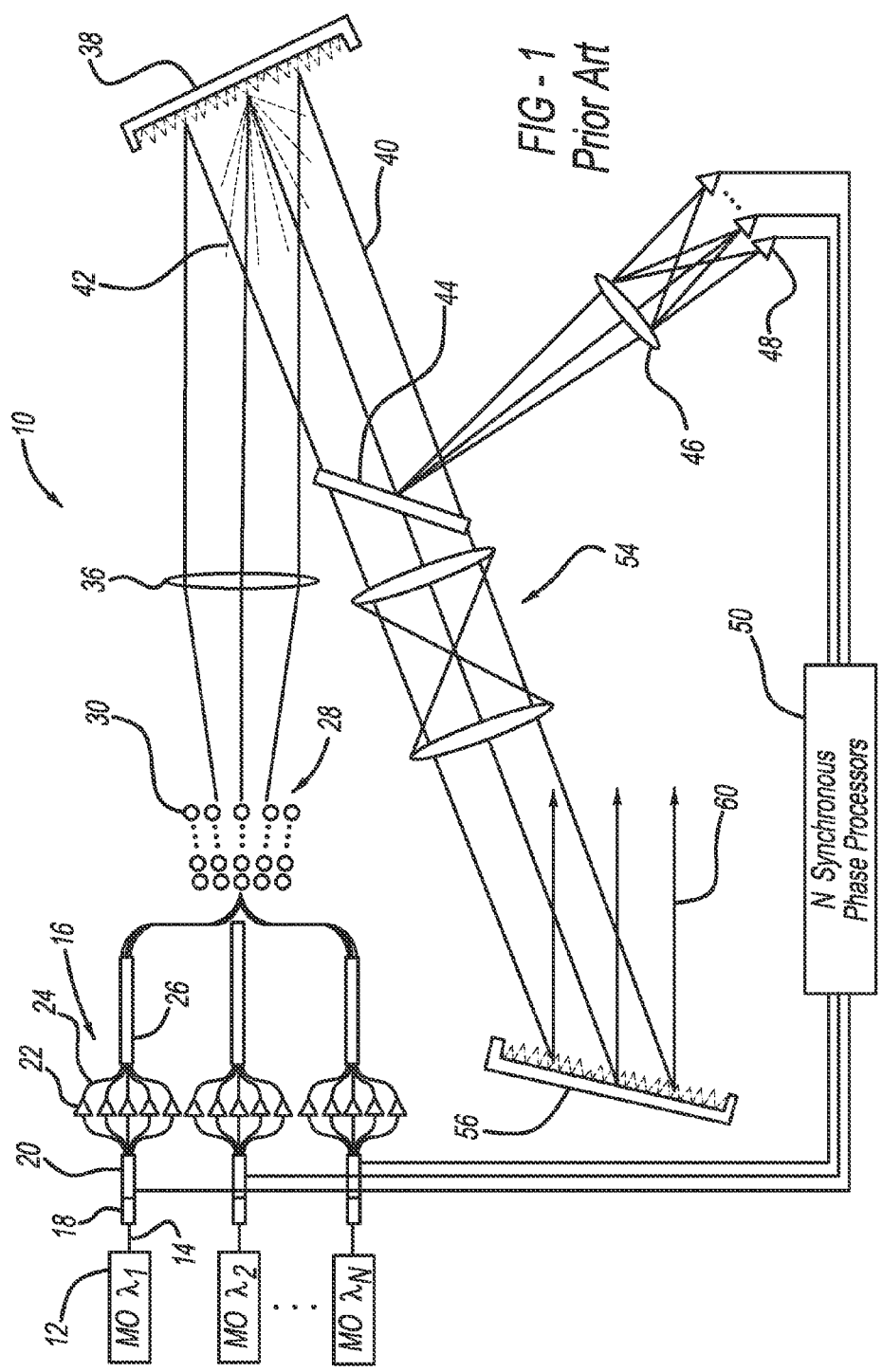
FIG. 1 is a schematic plan view of a known fiber laser amplifier including a separate DOE and SBC grating.

FIG. 1 is a schematic diagram of a known fiber laser amplifier system 10 including a plurality of N master oscillators (MO) 12 each generating a signal beam of an appropriate line-width on an optical fiber 14 for separate beam channels 16 having a slightly different wavelength $\lambda_1, \lambda_2, \ldots, \lambda_N$. The MO 12 may also incorporate a phase modulator to broaden its line-width to suppress nonlinearities in subsequent amplification. The signal beam on each of the fibers 14 is sent to a beam splitter 18 that splits the signal beam into a plurality (M) of split fiber beams where each split beam is provided to a separate phase modulator 20. The splitter 18 and the plurality of phase modulators 20 in each wavelength group 16 are separate devices, but are shown here as a single device because they can be implemented on a single chip. The phase modulators 20 correct the phase of each split fiber beam so that all of the beams are coherent and in phase with each other as will be discussed below. In this non-limiting embodiment, each wavelength group 16 includes five fiber beams, however, the number of fiber beams in each wavelength group 16 can be any number suitable for a particular application, and will be represented herein as M fiber beams. The M split fiber beams from the phase modulators 20 are each sent to a fiber amplifier 22, where the amplifiers 22 represent the doped amplifying portion of a fiber 24 that receives an optical pump beam (not shown).

Each wavelength group 16 of M fibers 24 are combined into a one-dimensional array of fiber beams by a suitable positioning device 26 so that all of the beams from all of the fibers 24 are combined to define a two-dimensional fiber array 28 of beams 30, where each column of the beams 30 in the array 28 are the beams from the fibers 24 within one of the wavelength groups 16 and have the same wavelength $\lambda_i$, where i=1, 2, 3, . . . , N for each of the columns. It will be understood that the array 28 has been rotated 90° from the propagation path of the beams 30 so that the orientation of the beams 30 can be visualized. It is noted that the configuration of the beams 30 in the array 28 is shown in an orientation where the spacing between the beams 30 of the longer wavelength is greater. Particularly, the wavelength $\lambda_1$ of the beams 30 in the left most column are closer together because the wavelength $\lambda_1$ is for exemplary purposes assumed to be the shortest and the wavelength $\lambda_N$ of the beams 30 in the right most column of the array 28 are spaced farther apart because the wavelength $\lambda_N$ is assumed the longest.

The M×N fiber beams 30 from the array 28 are collimated by collimating optics 36 where the beams 30 have slightly different angles of propagation as a result of their position in the array 28. The collimated fiber beams 30 are directed to a DOE 38 that is positioned in the back focal plane of the collimating optics 36 to ensure an optimal overlap of all of the beams 30 on the DOE 38 at the same location. The DOE 38 is an optical element having a periodic structure that directs the beams 30 in respective columns that are coherent into respective single beams for each of N columns in array 28 so that N number of coherently combined beams 40, each at respective wavelengths $\lambda_i$, where=1, 2, 3, . . . , N, propagating in slightly different directions are reflected from the DOE 38. The DOE 38 will also diffract a number of spurious order beams 42 as a result of DOE inefficiencies. Proper phasing results in an efficient combination of M beams from each group 16 at wavelength A.

The N combined beams 40 diffracted by the DOE 38 are sampled by a splitter 44 so that N sample beams of low power, one for each wavelength $\lambda_i$, are generated, where each sample beam has a slightly different angular displacement. A lens 46 focuses the N sample beams to spatially separated phase detectors 48, such as photodetectors, where each detector 48 detects the phase of the M constituent beams at one of N specific wavelengths, which have been combined by the DOE 38. The phase detectors 48 measure the phase of the combined beam at the particular wavelength $\lambda_i$ and provide an electrical measurement signal to a synchronous phase processor 50, where a separate processor 50 is provided for each of the detectors 48.

The phase of the constituent fiber beams in each N combined beams can be distinguished in a single output from the phase detector 48 by uniquely dithering or coding the constituent fiber beams in phase or amplitude, such as by using distinct frequencies for frequency modulation (FM) or amplitude modulation (AM), distinct codes for code division multiple access (CDMA) or time division multiple access (TDMA), etc., so that a synchronous detector scheme can distinguish the constituent phase signals for each fiber beam in the combined beam. Such a technique is disclosed, for example, in U.S. Pat. No. 7,346,085 issued Mar. 18, 2008 to Rothenberg et al., titled Multi-Stage Method and System for Coherent diffractive Beam Combining, assigned to the assignee of this application and herein incorporated by reference. Each synchronous phase processor 50 decodes the distinct constituent phases in the measurement signal from the phase detector 48, and generates phase error correction signals for each fiber beam that are sent to the corresponding phase modulator 20 so that adjustments to the phase of the individual fiber beams in the fiber amplifiers 22 causes all of the constituent fiber beams to be locked in phase. Because the array of fiber beams is combined into a single beam, fill factor is eliminated, and the output beam can be focused to a nearly diffraction limited spot to reach nearly the theoretical limit of brightness provided by the total combined power of the beams.

The N angularly displaced combined beams 40 that pass through the beam sampler 44 are relayed by relay optics 54 and are imaged onto an SBC grating 56 to provide spectral beam combination of all of the N combined beams 40 of varied wavelengths while preserving the required angles of incidence. The wavelength $\lambda_i$ of each of the N combined beams 40 is selected in accordance with the angular dispersion of the SBC grating 56 to precisely compensate for angular deviation. The SBC grating 56 includes a periodic grating structure to refract the N combined beams 40 having different angles into a common direction. Thus, a single diffraction limited output beam 60 is provided at the output of the fiber amplifier system 10 that combines all of the M×N beams with high efficiency and with low power in the spurious diffracted orders.

It is noted that although the DOE 38 and the SBC grating 56 are shown as reflective structures that reflect the optical beams that impinge thereon, other fiber laser amplifier system designs may employ transmissive elements where the optical beams that impinge the DOE or SBC grating propagate through the optical element.

Figure 2:
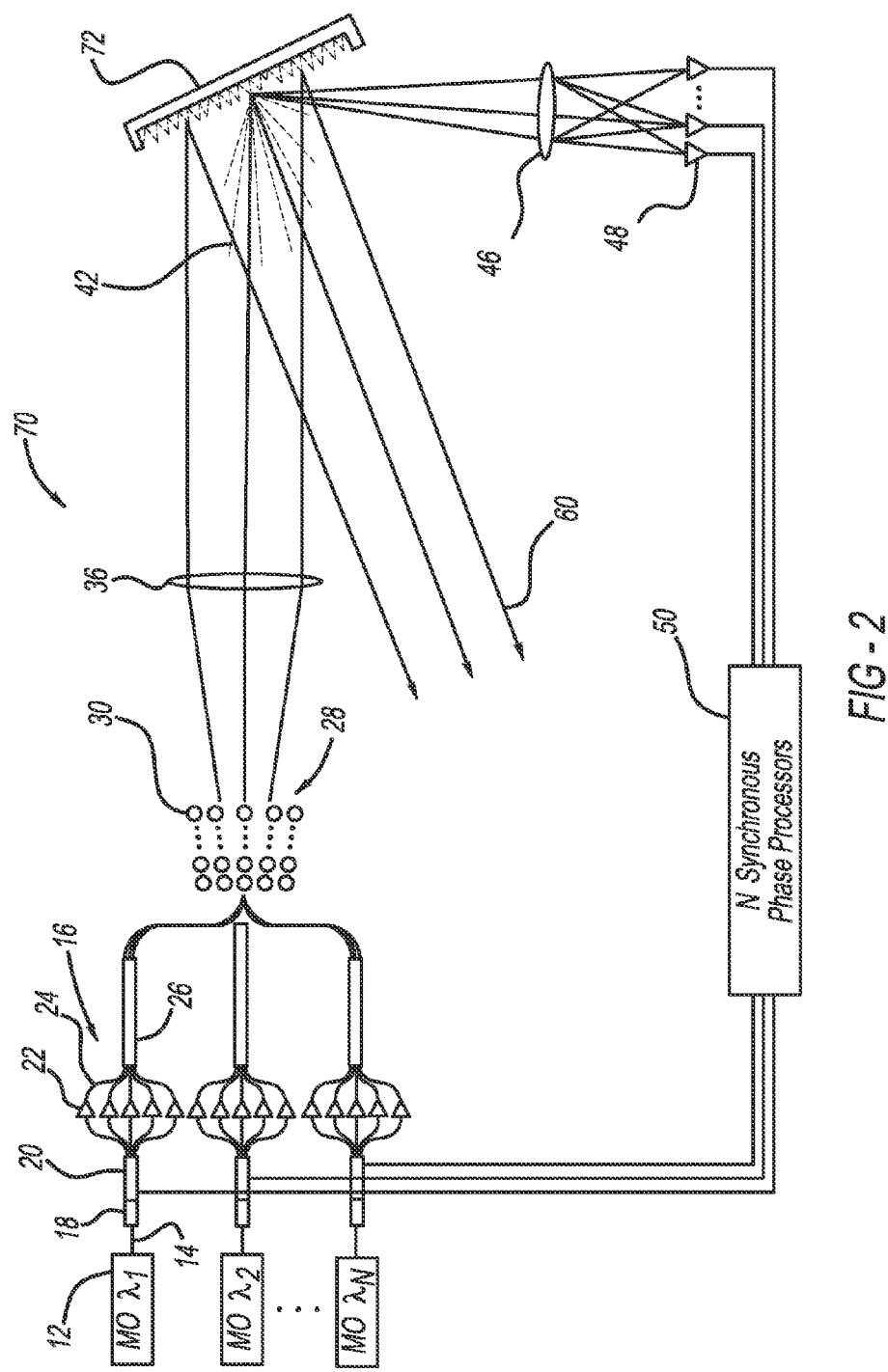
FIG. 2 is a schematic plan view of a fiber laser amplifier including an integrated DOE and SBC grating.

FIG. 2 is a schematic diagram of a fiber laser amplifier system 70 similar to the fiber laser amplifier 10, where like elements are identified by the same reference numeral. The amplifier system 70 includes an integrated DOE and SBC grating optical element 72 instead of the separate DOE 38 and SBC grating 56 discussed above that provides a single optical element that combines both the coherent beams and the beams of differing wavelengths. This provides the advantage of fewer optical elements and a more compact size for the amplifier system. The low power sample beam directed towards the lens 46 is the $0^{th}$ order reflections from the SBC grating in the optical element 72. The $1^{st}$ or higher order diffracted beams from the SBC grating is part of the output beam 60.

As mentioned above, the '588 patent also discloses an integrated DOE and SBC grating. However, the '588 patent does not discuss how that integrated element is fabricated to provide the desired periodic shapes for both the DOE and the SBC grating in the same device. As will be discussed below, the present invention proposes a fabrication technique to provide such an integrated optical device.

Figure 3:
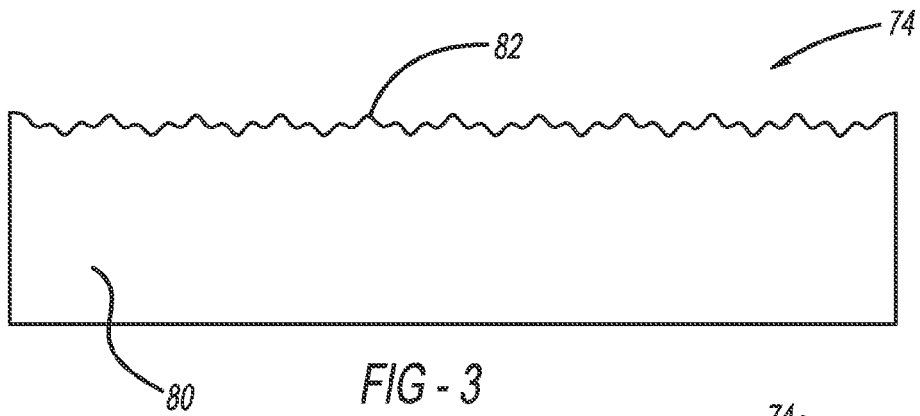
FIGS. 3-7 are progressive views of a fabrication process for fabricating the integrated DOE combiner and SBC grating provided in the amplifier shown in FIG. 2.
Figure 4:
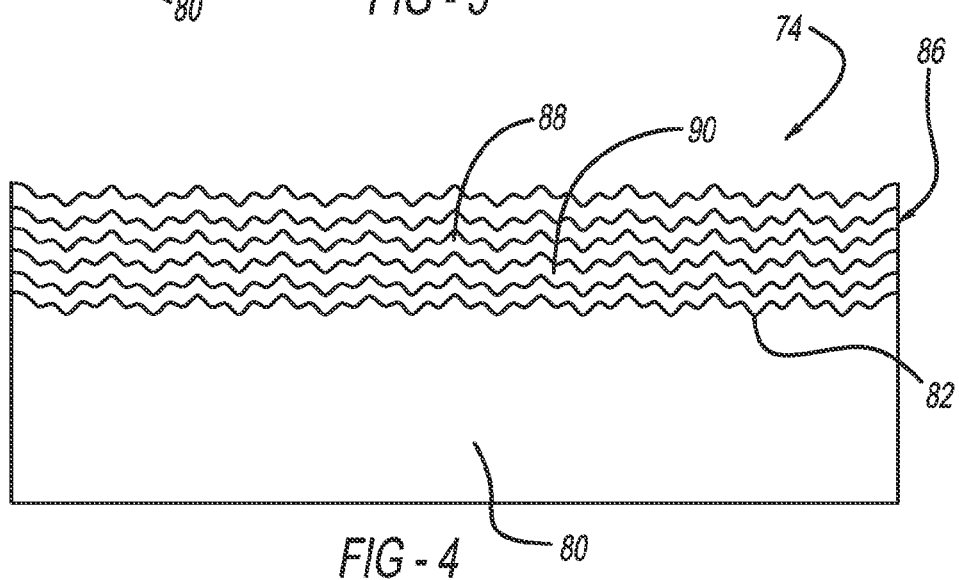
Figure 5:
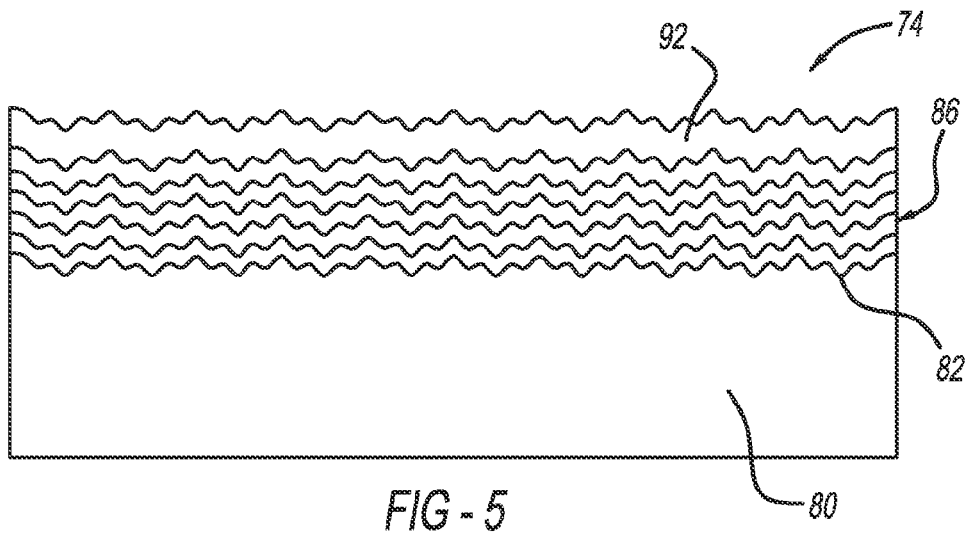
Figure 6:
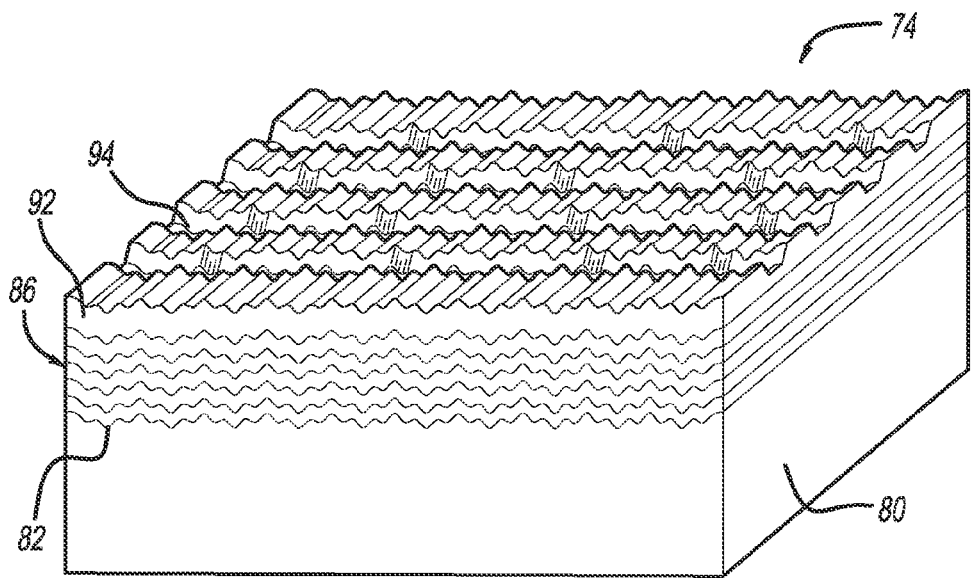
Figure 7:
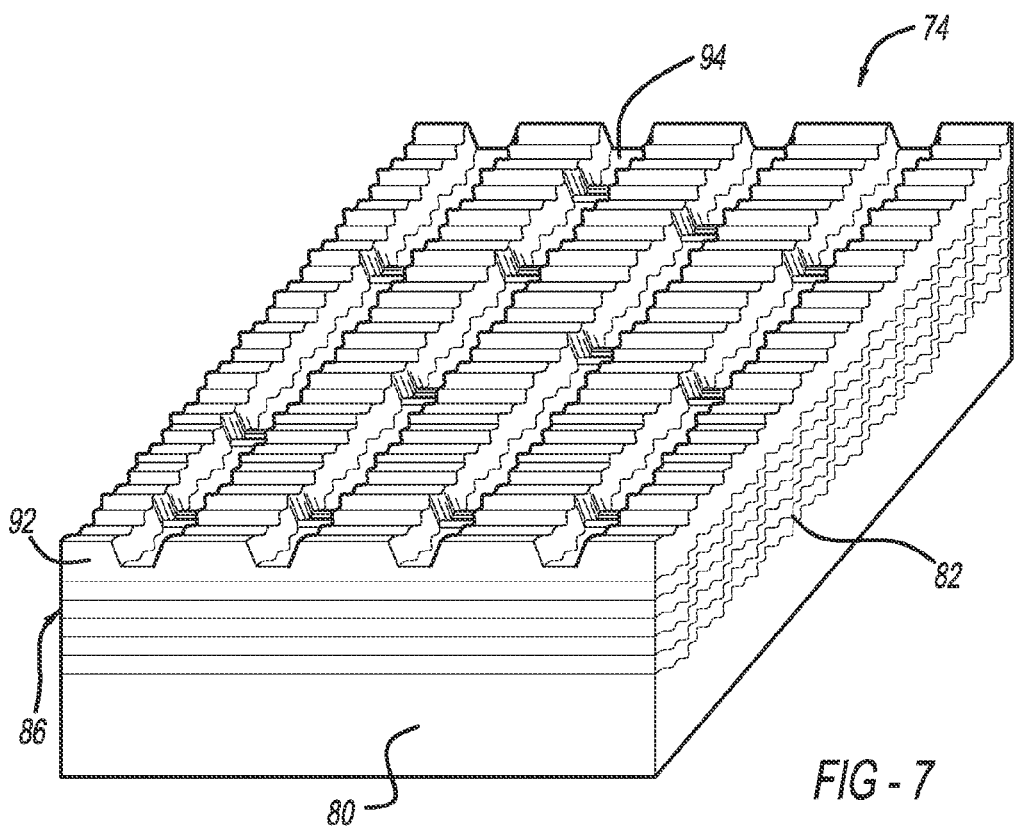

FIGS. 3-7 illustrate a technique for fabricating the integrated optical element 72. Particularly, FIGS. 3-5 show profile views and FIGS. 6 and 7 show perspective views of an element 74 at progressive fabrication steps that will ultimately lead to the integrated element 72. In this fabrication technique, a substrate 80 having an optical flat surface is provided, which is etched to provide a DOE periodic structure 82 having a function h(x). Particularly, the function h(x) is a smooth height function typically having a magnitude on the order of the wavelength of interest that is periodic along the x-axis and having a period d. For each of the N columns in the fiber array 28, the wavelength $\lambda_i$ determines the ratio $\lambda_i/d$, which gives the required angular separation of the M beams within that column. The period of the structure 82 is typically about 100 times the wavelength or larger of the beam of interest so that maximum surface angles are typically small, such as on the order of tens of mrad. In one non-limiting embodiment, the substrate 80 is a suitable optical glass or silica and is a few millimeters in thickness. The etch forming the periodic structure 82 in the top surface of the substrate 80 can be any suitable etch for the purposes described herein, such as a lithography etch, a holographic etch, etc., as would be well understood by those skilled in the art. The structure 82 will typically be formed about 1 μm into the top surface of the substrate 80. It is noted that for illustration purposes herein, the dimension of the substrate 80 is shown in the x-direction.

A conformal multi-layer dielectric high-reflection (HR) coating 86 is then deposited on the periodic structure 82 as shown in FIG. 4. The multi-layer coating 86 includes an alternating sequence of a high index of refraction dielectric layer 88 and a low index of refraction dielectric layer 90, many of which are known in the art. In this non-limiting embodiment, each of the layers 88 and 90 are about one-quarter of a wavelength λ in thickness, and the final thickness of all of the layers 88 and 90 could be on the order of 5-10 μm. Using proper care towards a uniform deposition process the underlying DOE etched structure 82 will be accurately reproduced in the HR coating 86. The periodic structure 82 in the x-direction provides the DOE operation and the HR coating 86 ensures high efficiency of reflection.

To produce the etch for the SBC grating, a top dielectric layer 92, such as silica and being a few μm or less in thickness, is deposited on the multi-layer coating 86, as shown in FIG. 5, so that the periodic pattern defining the structure 82 extends through the layer 92.

The next step is to etch appropriately shaped grooves or channels that are periodic in the y-direction through a top surface of the dielectric layer 92, as shown in FIG. 6. The etch for the SBC grating defines channels 94 in the dielectric layer 92 that provide the periodic structure for the grating. In this non-limiting embodiment, the channels 94 have a trapezoidal cross-sectional shape for a particular application. However, as will be appreciated by those skilled in the art, other shapes for other applications may be equally applicable, such as square, sawtooth, triangular, etc. It is noted that the period of the periodic structure 82 for the DOE is about 100 μm to combine the coherent beams and the period of the channels 94 for the SBC grating is about 1 μm to combine the beams of varying wavelength. It is also noted that if the integrated DOE/SBC device is a transmissive device, either of the coating 86 and the dielectric layer 92 may or may not need to be included and if the integrated DOE/SBC device is a reflective device, both of the coating 86 and the dielectric layer 92 would be required. FIG. 7 shows the device 74 with the y-direction facing forward after the SBC grating structure has been etched in the dielectric layer 92.

In one embodiment for producing the SBC grating, the device is coated with a photoresist, and a pattern is exposed with the appropriate period, typically about 1 um or less using a standard holographic or lithographic method, which ensures precision periodicity. In a holographic method, fringes illuminate the resist in a direction orthogonal to the underlying DOE pattern to provide the necessary periodicity in the y-direction. Since the etched DOE surface is smooth and at a low angle, the photoresist easily conforms to the periodic DOE shape. The photoresist is then developed and etched through a fraction of the dielectric layer 92 on the multi-layer coating 86 to optimize the groove shape and aspect ratio so that the desired grating diffraction efficiency is achieved. The completed hybrid optic shows the smooth periodic DOE pattern along the x-direction on the grooves of the periodic SBC grating along the y-direction.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An optical device comprising:
   a substrate having a top surface;
   a periodic pattern formed in the top surface of the substrate in a first direction;
   a plurality of dielectric layers deposited on the top surface of the substrate and having a shape that conforms to the periodic pattern;
   a top dielectric layer deposited on the plurality of dielectric layers so that the top dielectric layer has the shape of the periodic pattern, said top dielectric layer having a top surface and a thickness greater than the thickness of any of the plurality of dielectric layers; and
   a periodic grating formed through the top surface and into the top dielectric layer, said periodic grating having channels that extend along a second direction substantially orthogonal to the first direction where the periodic pattern is formed into the periodic grating so that the pattern crosses the channels.

2. The optical device according to claim 1 wherein the substrate is glass or silica.

3. The optical device according to claim 1 wherein the plurality of dielectric layers are a plurality of dielectric layers being deposited in an alternating sequence of a high index of refraction dielectric layer and a low index of refraction dielectric layer.

4. The optical device according to claim 1 wherein the top dielectric layer is silica.

5. The optical device according to claim 1 wherein the periodic pattern is effective to be used as a diffractive optical element for combining coherent beams having a different angular displacement and the periodic grating is effective to be used as a spectral beam combiner for combining beams of differing wavelengths having a different angular displacement.

6. The optical device according to claim 1 wherein the periodic pattern has a thickness of about 1 μm.

7. The optical device according to claim 1 wherein the channels have a general trapezoidal cross-sectional shape.

8. The optical device according to claim 1 wherein the top dielectric layer has a thickness of a few micrometers.

9. The optical device according to claim 1 wherein the plurality of dielectric layers combine to a thickness between 5 and 10 μm.

10. The optical device according to claim 1 wherein the optical device is part of a fiber amplifier system.

11. An integrated optical device that includes a diffractive optical element for combining coherent beams having a different angular displacement and a spectral beam combiner for combining beams of differing wavelengths and having a different angular displacement, said device comprising:
    a substrate having a top surface;
    a periodic pattern for the diffractive optical element formed in the top surface of the substrate in a first direction; and
    a periodic grating formed into the periodic pattern for the spectral beam combiner, said periodic grating having periodic channels that extend in a second direction substantially orthogonal to the first direction where the periodic pattern is formed into the periodic grating so that the pattern crosses the channels.

12. The optical device according to claim 11 further comprising a top dielectric layer deposited relative to the periodic pattern so that the top dielectric layer has the shape of the periodic pattern.

13. The optical device according to claim 12 further comprising a plurality of dielectric layers deposited between the periodic pattern and the top dielectric layer and having a shape that conforms to the periodic pattern.

14. The optical device according to claim 13 wherein the plurality of dielectric layers are a plurality of dielectric layers being deposited in an alternating sequence of a high index of refraction dielectric layer and a low index of refraction dielectric layer.

15. The optical device according to claim 11 wherein the optical device is part of a fiber amplifier system.

16. An optical device comprising:
a substrate having a top surface;
a periodic pattern formed in the top surface of the substrate in a first direction; and
a periodic grating deposited on the substrate that conforms to the periodic pattern, said periodic grating having channels that extend along a second direction substantially orthogonal to the first direction where the periodic pattern is formed into the periodic grating so that the pattern crosses the channels.

17. The optical device according to claim 16 further comprising a top dielectric layer deposited relative to the periodic pattern so that the top dielectric layer has the shape of the periodic pattern.

18. The optical device according to claim 17 further comprising a plurality of dielectric layers deposited between the periodic pattern and the top dielectric layer and having a shape that conforms to the periodic pattern.

19. The optical device according to claim 16 wherein the periodic pattern is effective to be used as a diffractive optical element for combining coherent beams having a different angular displacement and the periodic grating is effective to be used as a spectral beam combiner for combining beams of differing wavelengths and having a different angular displacement.

20. The optical device according to claim 19 wherein the optical device is part of a fiber amplifier system.

\* \* \* \* \*